United States Patent
Nuutinen et al.

(10) Patent No.: US 7,016,439 B2
(45) Date of Patent: Mar. 21, 2006

(54) METHOD AND ARRANGEMENT FOR INTERFERENCE CANCELLATION

(75) Inventors: Jukka Nuutinen, Oulu (FI); Tero Oilinki, Utajärvi (FI); Kari Horneman, Oulu (FI); Markku Lahtinen, Jääli (FI); Janne Vähäkangas, Kokkola (FI); Hannu Väisänen, Kiiminki (FI)

(73) Assignee: Nokia Corporation, Espoo (FI)

( * ) Notice: Subject to any disclaimer, the term of this patent is extended or adjusted under 35 U.S.C. 154(b) by 372 days.

(21) Appl. No.: 10/179,011

(22) Filed: Jun. 26, 2002

(65) Prior Publication Data

US 2003/0016771 A1  Jan. 23, 2003

Related U.S. Application Data

(63) Continuation of application No. PCT/FI00/01158, filed on Dec. 28, 2000.

(30) Foreign Application Priority Data

Dec. 29, 1999 (FI) .................................. 19992807

(51) Int. Cl.
*H04B 1/00* (2006.01)
(52) U.S. Cl. ...................................... 375/346
(58) Field of Classification Search ................ 375/130, 375/132, 136, 316, 346
See application file for complete search history.

(56) References Cited

U.S. PATENT DOCUMENTS 3,706,933 A * 12/1972 Bidell et al. ................. 375/149
4,370,655 A * 1/1983 Masak ......................... 342/383
4,613,978 A  9/1986 Kurth et al.
5,168,508 A  12/1992 Iwasaki et al.
5,325,204 A  6/1994 Scarpa
5,612,978 A  3/1997 Blanchard et al.
5,936,920 A  8/1999 Noda
5,974,101 A  10/1999 Nago
6,549,784 B1 * 4/2003 Kostic et al. ................ 455/501

FOREIGN PATENT DOCUMENTS

WO  WO 00/25436  5/2000

OTHER PUBLICATIONS

Moelker et al., "Capacity of co-existent cellular CDMA and GSM with shadowing and imperfect sectorization, power control and notch filtering," IEEE 1997, pp. 27-31.
Noel et al., "Experimental CDMA data overlay of GSM network," Electronics Letters, Apr. 15, 1999, vol. 35, No. 8, pp. 614-615.

* cited by examiner

*Primary Examiner*—Kevin Burd
(74) *Attorney, Agent, or Firm*—Pillsbury Winthrop Shaw Pittman LLP

(57) ABSTRACT

The invention provides a method and an arrangement which allow avoidance of significant degradation in performance of a broadband system receiver or even blocking of the receiver, caused by simultaneous use of the same frequency or simultaneous use of adjacent frequencies by a narrowband and a broadband communications systems, or background noise peaks produced by a plurality of various man-made interference signals. In one invention embodiment, the energy of the received signal is determined in narrower sub-bands, the average of the sub-band signal energies is calculated, the energies of the sub-band signals are compared with said average and if any of the sub-band signal energies exceeds the average by a predetermined threshold value, interference is cancelled by a tunable bandstop filter.

28 Claims, 9 Drawing Sheets

METHOD AND ARRANGEMENT FOR INTERFERENCE CANCELLATION

FIELD OF THE INVENTION

This application is a Continuation of International Application PCT/FI00/01158 filed Dec. 28, 2000, which designated the U.S. and was published under PCT Article 21(2) in English.

The invention relates to a method and arrangement for cancelling harmful narrowband interference signals or reducing interference caused by these signals in broadband communications systems, such as cellular radio systems.

BACKGROUND OF THE INVENTION

In cellular radio systems, background noise, which is modelled as AWGN (Additive White Gaussian Noise) and various interferences, such as interference signals or fading multipath-propagated signals may be summed to a signal on a radio channel. One way to improve the reliability of data transmission is to use spread spectrum technique. The spread spectrum methods are data transmission methods, in which the signal is transmitted on a much broader bandwidth than the minimum bandwidth required for data transmission. FIG. 1 shows the schematic structure of a spread spectrum system. The signal spectrum is spread in a transmitter on the frequency level after information modulation 100 by using a pseudo-random spreading code 102, which is independent of the original, generally digital, information signal. In a receiver, the signal is despread by multiplying the signal again by the spreading code 104, whereafter the signal is demodulated 106. The performance of the spread spectrum system against interference signals is often detected by detection amplification, which represents improved signal-to-noise ratio in the receiver. Because the interference does not generally correlate with the spreading code, the despreading of the spectrum in the receiver is spreading modulation in view of interference, i.e. the interference signal resembles common noise on the channel, and as the information signal is a narrowband signal after despreading, most of the interference can be filtered off, which provides detection amplification.

A method, in which all users transmit simultaneously using the same frequency band and in which the signals of different users can be distinguished in receivers on the basis of the spreading code by using a specific spreading code on each communication connection between a base station and a mobile station, is called the code division multiple access method CDMA. Cross correlation properties of the spreading codes will be minimized by selecting the codes to be used such that they are mutually orthogonal. In WCDMA (Wideband Code Division Multiple Access) receivers the correlators are in synchronization with the signal to be identified on the basis of the spreading code. The signals that have been multiplied by some other code in the transmission stage, do not correlate, in an ideal case, with the code used for multiplication and thus they will remain in broadband format. Hence, they appear as noise in view of the desired signal. The object is thus to detect the desired user signal among a plurality of interfering signals. In practice, the spreading codes are not uncorrelated, because the number of mutually orthogonal codes is insufficient, and therefore the signals of other users produce error in the detection of the desired signal by distorting the received signal non-linearly.

In the future, the same or an adjacent frequency band can be simultaneously used by a plurality of cellular radio systems, typically a narrowband system, such as the GSM (Global system for Mobile Communications) or the PDC (Pacific Digital Cellular System), and a broadband system, such as the WCDMA system). In simultaneous use of the same frequency or simultaneous use of an adjacent frequency, the broadband system is typically used for high-rate data transmission and the narrowband system for speech transmission. FIG. 2 shows a typical overlay use situation. A base station 204 of the narrowband NB system forms there a narrowband cell 200 and a base station 206 of the WCDMA system forms a broadband cell 202. Narrowband transmission 210 interferes with receivers of both the broadband base station and subscriber terminal 208. In this kind of simultaneous use, improved performance provided by detection amplification of the broadband system is not always sufficient, but the broadband signal having considerably higher power can significantly deteriorate the receiver performance of the broadband system, such as the WCDMA system, or even block it. The WCDMA system is interference limited, so that interference reduces either capacity or coverage area. It appears from FIG. 3 how the narrowband signal 302 power is considerably higher than the broadband signal 300 power, which is close to the power level of background noise. Since the broadband signal resembles AWGN noise on the channel, it does not cause extra interference in the receiver of the narrowband system. In addition to the power level of the interfering signal, many other factors, such as the duration of interference, the modulation method and encoding used, affect the performance, i.e. tolerance to various interference, of the cellular radio systems.

Methods have been presented attempting to reduce degradation in performance caused to the receiver of the broadband system by the narrowband system in the simultaneous use of the same frequency band. In known methods, interference cancellation generally requires that various mathematical transformation methods of signals be used for regenerating the signal and the interference, which takes time and computing capacity, or, the interference cancellation is implemented in baseband frequency parts, even though it should be implemented at the earliest possible stage. The known methods, in which interference cancellation is implemented in radio frequency parts and in which the signal and the interference need not be regenerated, are based on available advance information on the interfering system. One method of this kind is disclosed in "Experimental WCDMA data overlay of GSM network" by Noël and Widdowson, British Telecom Res. Labs., *Electronic Letters*, Apr. 15, 1999, Vol. 35, Issue 8, which is incorporated herein by reference. Said publication describes a method which attempts to cancel interference caused by a narrowband signal as close to the radio frequency parts as possible to minimize the effects of interference by using a band-stop filter tuned to a predetermined frequency. The described method has a drawback that the frequency used by the interfering system must be known in order to be able to tune the band-stop filter. Often, this is only possible if the broadband system and the interfering narrowband system are used by the same operator. In addition, the performance of narrowband systems is often improved, particularly in multipath propagation environments, by using frequency hopping which allows the interfering narrowband signal to change the frequency it uses in the frequency band of the broadband system. In this case, tuning the band-stop filter in advance onto one frequency does not improve the performance sufficiently. A narrow band-stop filter is not sufficiently efficient either for cancelling interference caused by background noise peaks, such as microwave ovens or car starting systems, generated by a plurality of other man-made interference signals. Typically, also in these situations, signals, which cause interference in the receiver band of the broadband system, vary as a function of time, and therefore it is not possible to know their frequencies in advance in order for the filter to be tuned.

BRIEF DESCRIPTION OF THE INVENTION

The object of the invention is to provide a method and an arrangement implementing the method which allows to avoid a significant degradation in performance of a broadband system receiver or even blocking of the receiver, caused by simultaneous use of the same frequency or simultaneous use of adjacent frequencies by a narrowband and a broadband communications systems, or background noise peaks, such as microwave ovens or car starting systems, produced by a plurality of various man-made interference signals. This is achieved by a method for cancelling interfering narrowband signals in a receiver of a broadband communications system. The method of the invention comprises determining the energy of a received signal in sub-bands narrower than the broadband communications system frequency band, calculating an average of the energies of the sub-band signals, comparing the energies of the desired sub-band signals with the average of the sub-band signal energies and cancelling interference if any of the sub-band signal energies exceeds the average by a predetermined threshold value.

The invention also relates to an arrangement for cancelling interfering narrowband signals in a receiver of the broadband communications system. In the arrangement according to the invention, the receiver comprises means for determining the energy of a received signal in sub-bands narrower than the frequency band of the broadband communications system, means for calculating the average of the sub-band signal energies, means for comparing the energies of the desired sub-band signals with the average of the sub-band signal energies and means for cancelling interference if any of the sub-band signal energies exceeds the average by a predetermined threshold value.

The preferred embodiments of the invention are disclosed in the dependent claims.

Several advantages are achieved with the method and arrangement according to the invention. Interference cancellation is implemented in the radio frequency parts, which allows to minimize the interference caused to the baseband parts. The frequencies used by the interfering narrowband systems need not be known in advance. Hence, the method is also applicable to cancellation of interference caused by a frequency-hopping or an unknown interfering system. Additionally, according to the invention, it is possible to improve the performance of the broadband system receiver also in a situation where interference originates from a plurality of sources. In that case, the interference is background noise in nature having numerous high-power peaks such that filtering of all narrowband signals is not possible without losing the desired signal information excessively. In these cases, power of the signal received from the channel is clipped to a desired, predetermined level, whereby the broadband signal itself will not be clipped at all, because its power level does not exceed the average. The method according to the invention is simple to implement, because the signal and the interference need not be regenerated using various signal transformation methods.

BRIEF DESCRIPTION OF THE DRAWINGS

In the following, the invention will be described in connection with preferred embodiments, with reference to the attached drawings, wherein.

DETAILED DESCRIPTION OF THE INVENTION

The present invention can be applied to a plurality of different types of situations where the narrowband and the broadband communications systems use the same frequency or adjacent frequencies simultaneously. In a simultaneous use situation of this kind, the narrowband signal, such as a signal in the GSM system, having a considerably higher power, can significantly degrade the performance of a receiver in the broadband system, such as the WCDMA system, or even block it.

The invention can also be applied to reduce the interference level caused by background noise peaks produced by a plurality of other interference signals, typically resulting from human activity, in a receiver of the broadband system, of which one example is the WCDMA system. In the following, the invention will be described in connection with the GSM and the WCDMA systems, without restricting thereto in any way, however. The invention can be applied to all receivers of the broadband communications systems: to network parts, such as base stations, and to various subscriber terminals alike.

Figure 4:
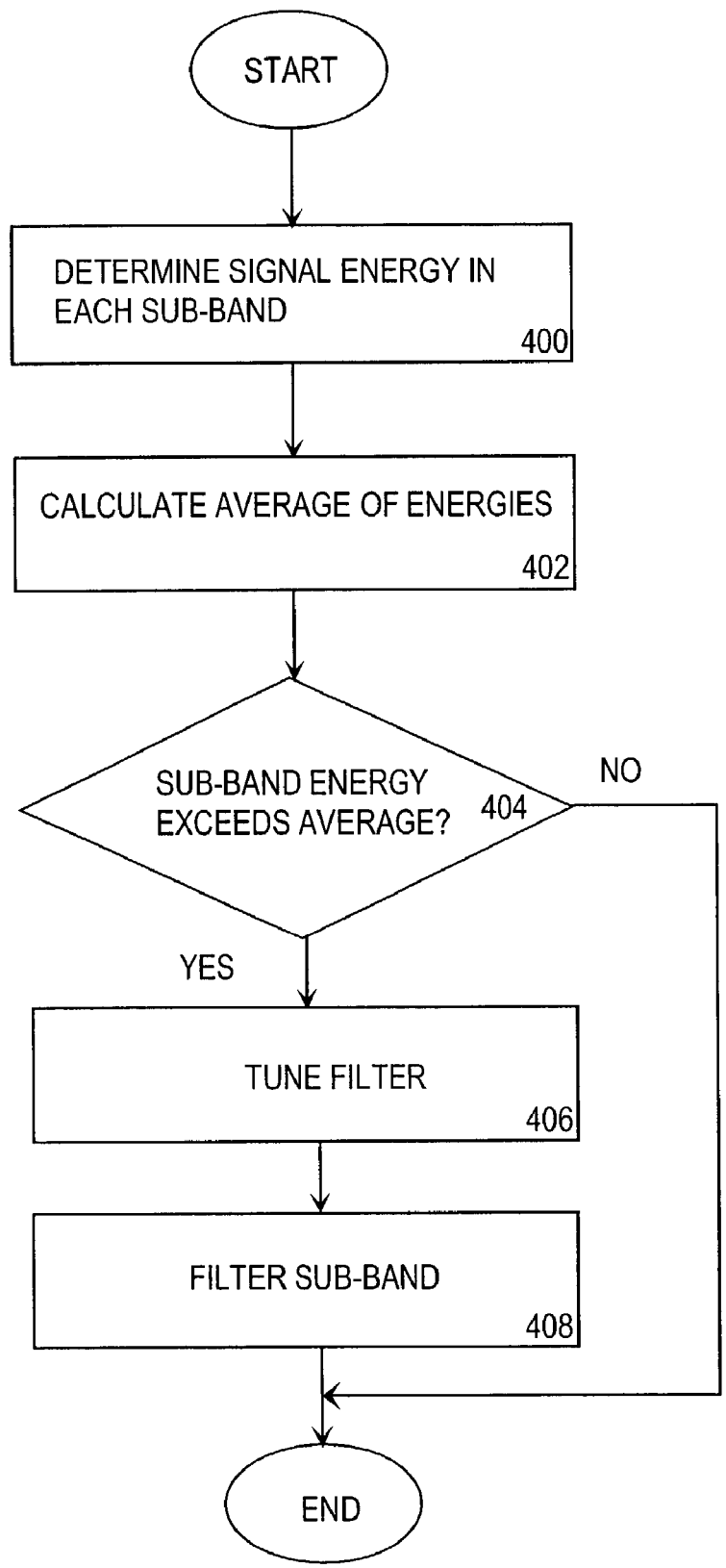
FIG. 4 is a flow chart of one solution according to the invention.

In the following, the principle of one embodiment of the invention is described by means of the flow chart of FIG. 4. In the embodiment of the invention described herein, a control signal is generated, by means of which a band-stop filter is tuned to a desired frequency. In this embodiment of the method according to the invention, the frequency band of the received signal is split into sub-bands, whose bandwidth is preferably defined by the bandwidth of an interfering narrowband system. In the case of the GSM system, the width of the sub-band is 200 kHz. The energy of the received signal is determined, for instance by an integrator, on each sub-band 400, whereafter the average of the measured signal energies is calculated 402. The signal energy of each sub-band is compared with the calculated energies of all sub-band signals, and if any of the sub-band signal energies exceeds the average by a predetermined threshold value 404, the band-stop filter is tuned to the frequency of said sub-band 406, whereafter the sub-band is filtered 408. If none of the sub-band signal energies exceeds the threshold value, the band-stop filter is not used.

Figure 1:
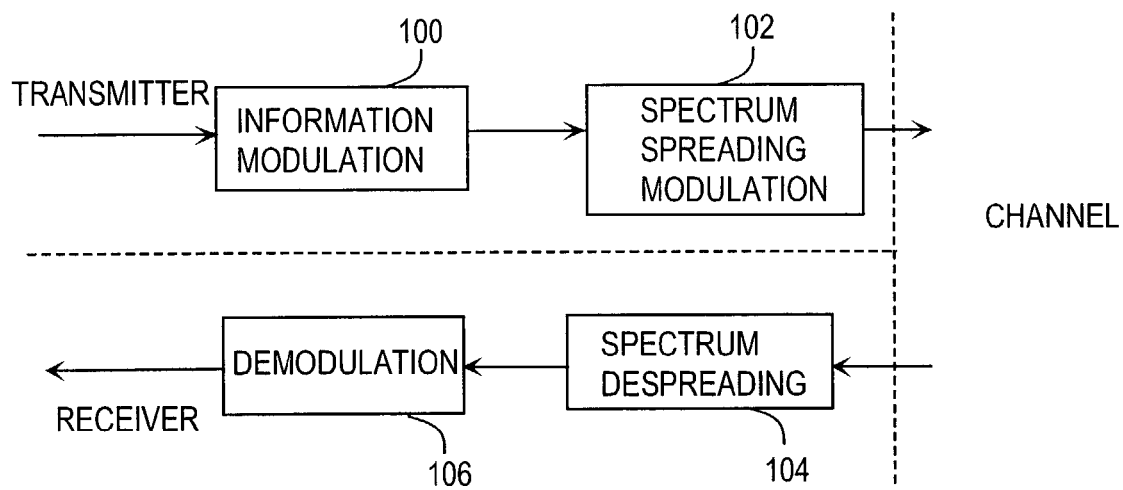
FIG. 1 illustrates the general structure of the described spread spectrum system.
Figure 2:
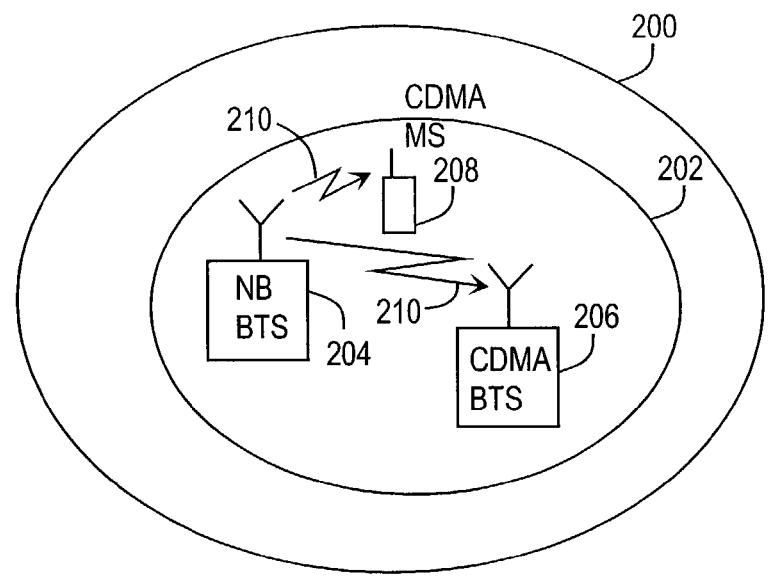
FIG. 2 illustrates a situation where the described narrowband and broadband systems are used simultaneously.
Figure 3:
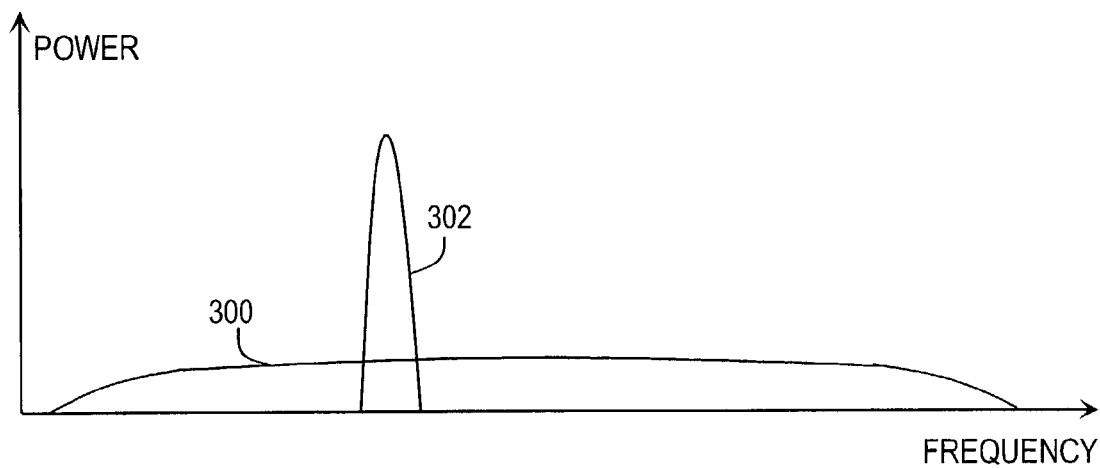
FIG. 3 illustrates interference caused by the narrowband system to the broadband system band on the frequency level.
Figure 5:
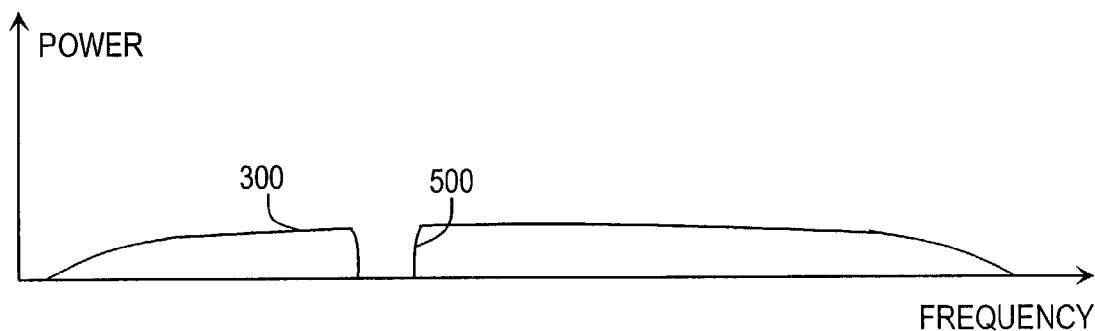
FIG. 5 shows the effect of one solution according to the invention on a band of a broadband signal on the frequency level.

FIG. 5 illustrates the effect of the above-described embodiment of the invention on the frequency level. In this case, a 200 kHz band 400 has been filtered out from the frequency band of the WCDMA signal 300. Thus, due to the filtering of the interfering signal, interference caused by the signal coming to the baseband parts is the least possible, and the receiver will not be blocked. If the employed system comprises two receivers, and the above-described method according to the invention is applied to only one receiver branch, a band is removed from the WCDMA signal only in said branch, whereby part of the signal in this 200 kHz band remains.

Figure 6A:
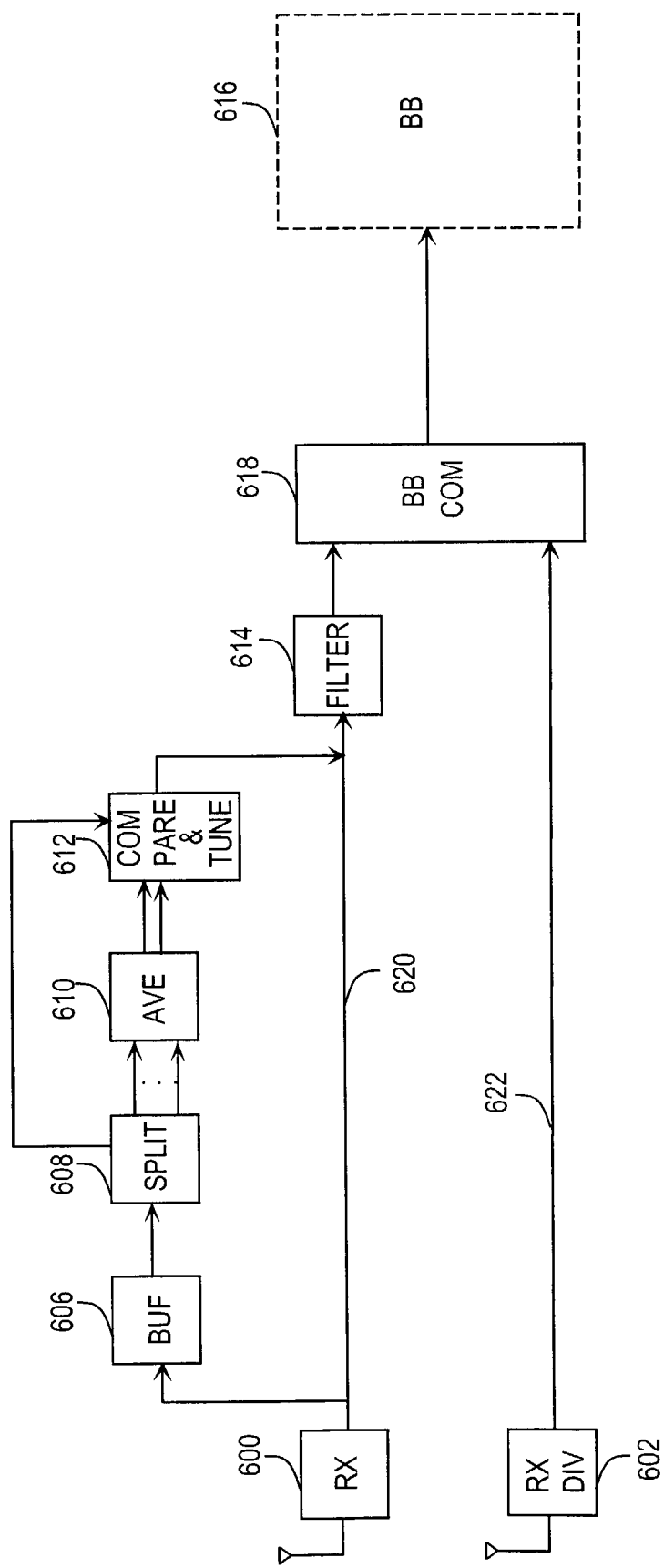
FIG. 6a is a block diagram of a receiver structure implementing one solution according to the invention.

FIG. 6a shows a block diagram of the receiver structure, when one embodiment of the invention is used for interference cancellation from the signal received from the main branch receiver. An incoming signal to the receiver 600 or a diversity receiver 602 may comprise, in addition to the WCDMA signal containing the desired information, other signals of the same WCDMA system and at least one interference signal, which in this description of the preferred embodiment of the invention is a GSM signal. The solution of FIG. 6a utilizes the improvement in the system performance provided by diversity reception. The diversity reception is not essential in any way to the invention, but the invention can also be applied in the case of one receiver. After the radio frequency front formed by the receivers, the signal is stored in a buffer memory 606 and the frequency band is split into frequency sub-bands of a predetermined width, in which the signal energy is determined by splitting and calculating means 608. The buffer memory and the splitting and calculating means can change places as indicated in FIG. 9. The methods, by which the signal energy is calculated, are well known in the field and they will not be explained in greater detail herein, since the application of the invention does not restrict in any way the implementation of the above-mentioned signal energy calculation operations.

The average of the sub-band energies is calculated next by the calculating means 610. According to the most preferable implementation alternative, the energies of all sub-bands are used for the calculation of the average, but some other selection is also possible, for instance, for making the calculation faster. If any of the sub-band signal energies exceeds the average by a predetermined threshold value, the band-stop filter is tuned to the frequency of said sub-band. Comparison of the sub-band signal energies with the average and the tuning of the band-stop filter are implemented by comparing and tuning means 612. The comparison of the sub-band signal energies with the average is typically implemented by means of a processor, software comprising necessary commands, or logic circuits. The tuning methods of the filter 614 are well known in the field, and the application of the invention does not restrict the selection thereof. The band-stop filter 614 tuned to the selected frequency filters the selected sub-band out from the received signal 620. The diversity receiver signal is applied as such onto a baseband combiner 618 without applying an interference cancellation algorithm according to the invention. Thus, inconveniently powerful interference signals have been removed from the signal to be conveyed to the baseband parts 616. If the interfering system concerned comprises baseband hopping and its hopping pattern is known, the embodiment of the invention can be made faster such that the energy of the received signal is calculated sub-band-wise according to the invention only on the current sub-band used by the interfering system and a previously calculated average or a typical average calculated by statistical methods is used as the reference average.

Figure 6B:
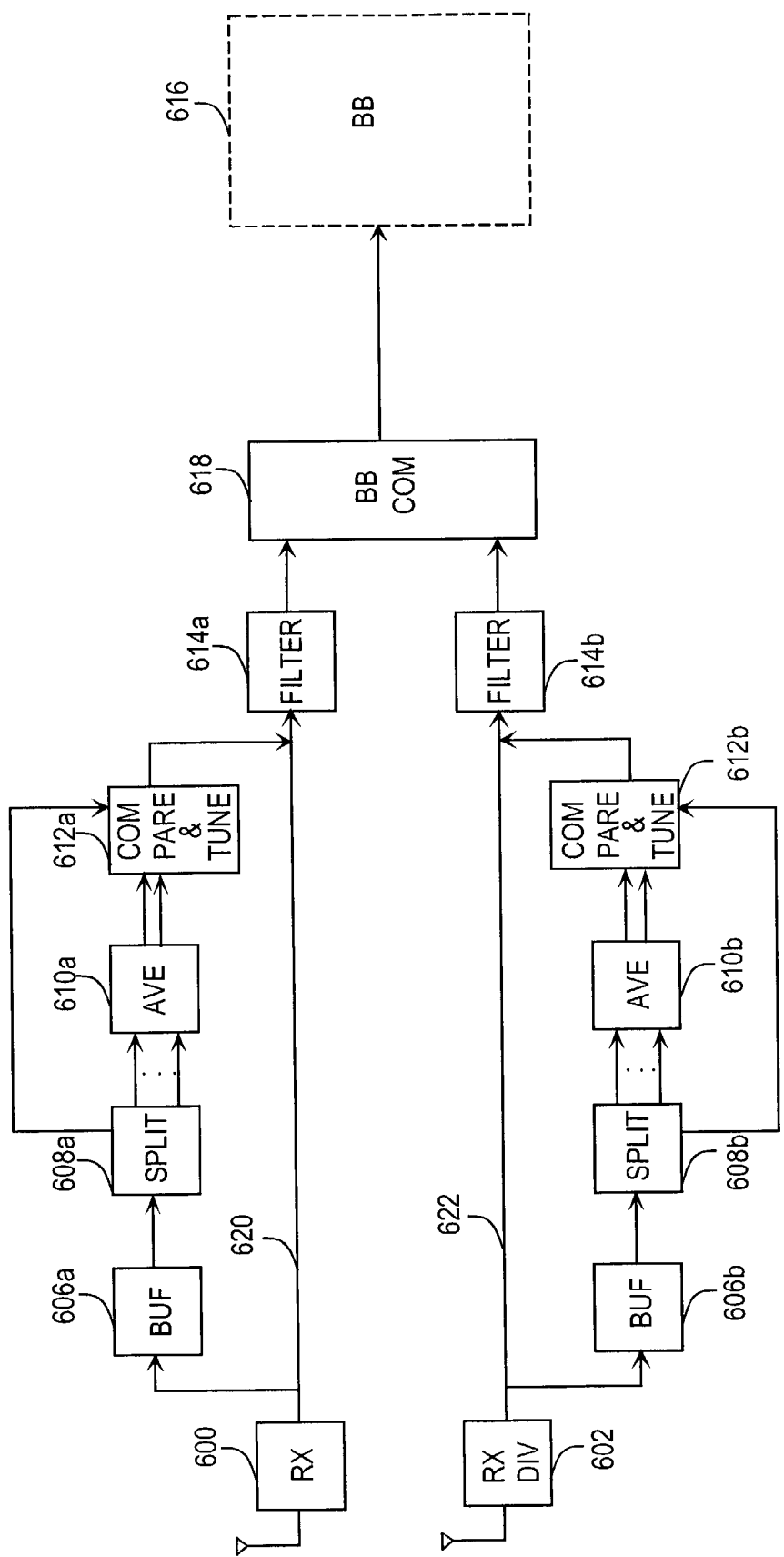
FIG. 6b is a block diagram of a receiver structure implementing one solution according to the invention, when the solution according to the invention is applied separately to either receiver branch.

FIG. 6b describes how the interference cancellation algorithm according to the invention can also be applied to either receiver branch separately. In that case, both the main branch receiver 600 and the diversirty branch receiver 602 each have specific buffer memories 606a–b, splitting and calculating means 608a–b, average calculating means 610a–b, comparing and tuning means 612a–b and filters 614a–b. Thus it is possible to select whether the method of the invention is applied to either branch or to one branch only. By means of the separate filters, it is possible to filter interference signals of different frequencies out from either branch. It is advantageous that the received signal 620 or 622 is filtered only in one receiver branch if the interference signal is received in one receiver branch only, because this is how the information signal is lost as little as possible.

Figure 7:
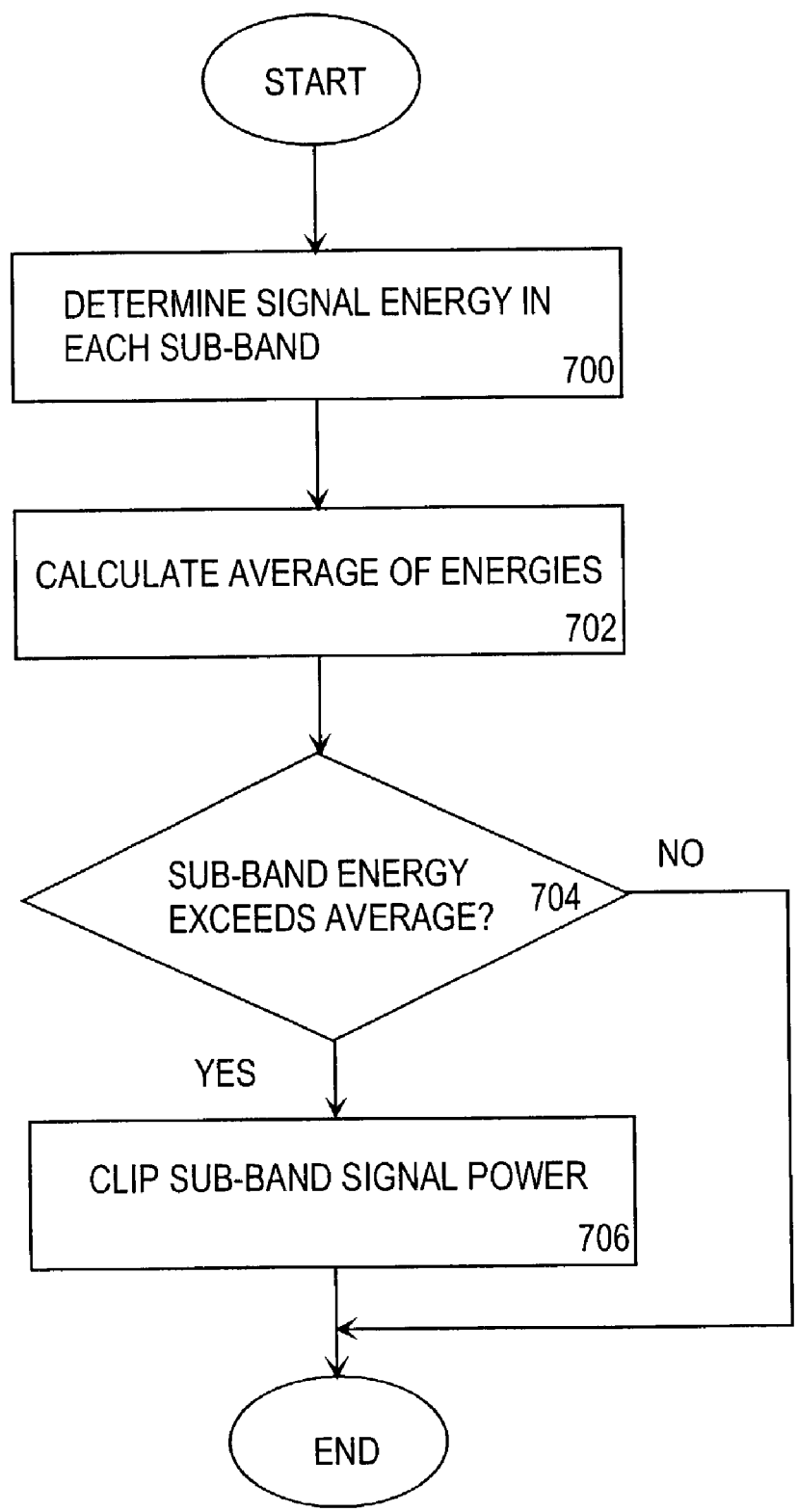
FIG. 7 is a flow chart of another solution according to the invention.

If there are a plurality of interfering signals having a narrow band in comparison with the system employed, for instance several GSM interference sources or other typically man-made signal peaks, it is advantageous to apply the embodiment of the invention that will be described next by means of the flow chart of FIG. 7. In this embodiment of the method according to the invention the frequency band of the received signal is split into sub-bands whose bandwidth is typically determined to be the bandwidth of an interfering system if known. If the interfering system is unknown, it is possible to attempt to determine the necessary sub-band width, for instance, by advance measurements or by utilizing the knowledge of systems potentially used in the area. After determining the sub-band width to be used, the energy of the received signal is measured, for instance by an integrator, on each sub-band 700, whereafter the average of the measured signal energies is calculated 702. The signal energy of each sub-band is compared with all measured sub-band signal energies and if the signal energy in any sub-band exceeds the average by a predetermined threshold value 704, the power of said sub-band signal is clipped to the level of the average power, or to the level which is the average power added with a predetermined threshold value 706. If none of the sub-band signal energies exceeds the threshold value, the power of none of the sub-band signals is clipped.

Figure 8A:
FIGS. 8a to 8c illustrate the effect of another solution according to the invention on the frequency level.
Figure 8B:
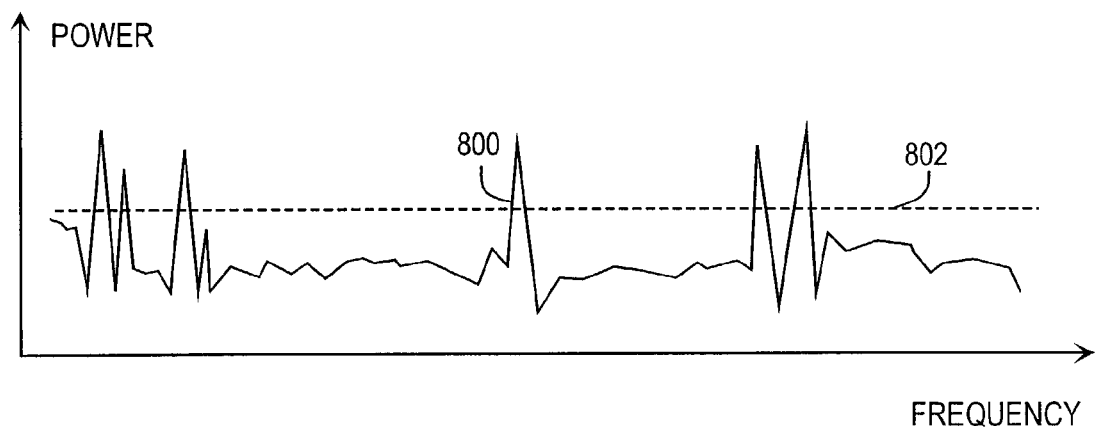
Figure 8C:
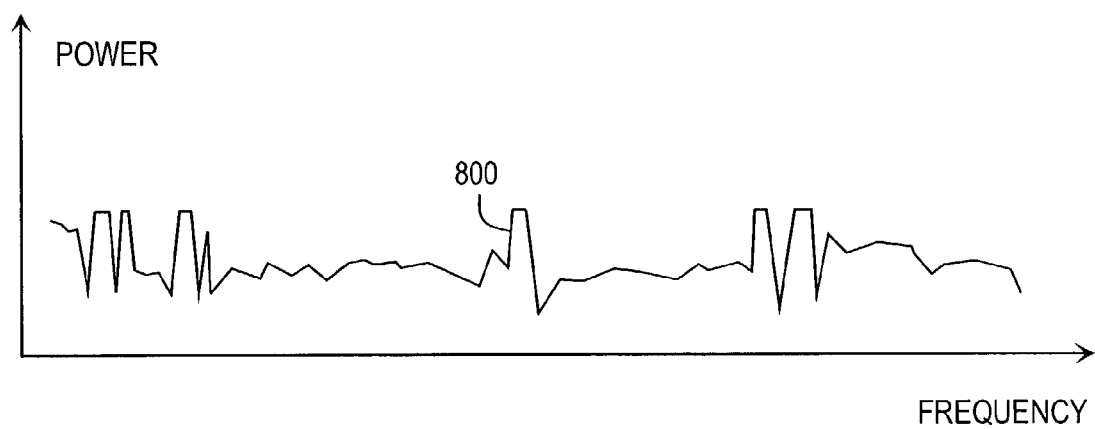

FIGS. 8a to 8c illustrate the effect of the above-described embodiment of the invention on the frequency level. FIG. 8a illustrates a broadband signal 800 on a channel, to which various interference signals 500 are summed. As appears from the figure, the power of the interference signals can be considerably higher than the power of the desired transmission signal. FIG. 8b illustrates how a level 802 is set according to the invention, typically the average added with a predetermined threshold value, so as to clip the interfering power peaks. FIG. 8c shows the power of the signal 800 on the frequency level after the power peak clipping.

Figure 9A:
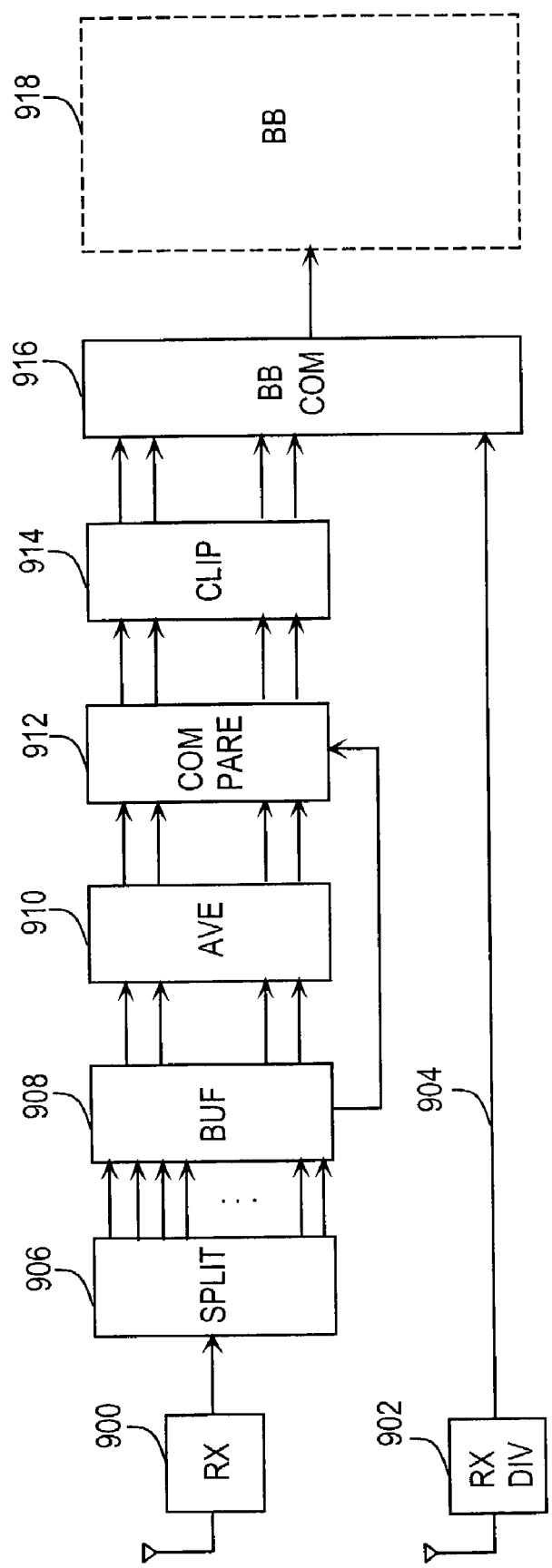
FIG. 9a is a block diagram of a receiver structure implementing another solution according to the invention.

FIG. 9a shows a block diagram of the structure of a receiver implementing one embodiment of the invention. The signal coming to the receiver 900 or the diversity receiver 902 may comprise, in addition to the WCDMA signal containing the desired information, other WCDMA signals and background noise which contains narrowband-type interference signals, such as GSM transmissions. The solution of the figure utilizes improved system performance provided by the diversity reception. Use of diversity in signal reception is in no way essential to the application of the invention, but the preferred embodiment of the invention described herein can also be applied without a diversity receiver. In the solution of the figure, interference cancellation to be described next is not performed on the diversity branch signal 904, but the signal is directly applied to a baseband combiner 916. The reason for this is that in certain circumstances it may be possible that a narrowband interference signal is not summed to all multipath-propagated signal components, for instance. Instead, the frequency band of the signal received by the main branch is split into frequency sub-bands of a predetermined width, in which sub-bands the signal energy is measured by splitting and calculating means 906, whereafter the values are stored in a memory 908. The buffer memory and the splitting and calculating means can change places, as appears from FIG. 6. The manner described herein has an advantage that the requirements for the component(s) used as buffer memory are not as strict as those in the solution of FIG. 6. The methods, by which the signal energy is calculated, are well known in the field and they will not be explained in greater detail herein, since the application of the invention does not restrict in any way the implementation of the above-mentioned signal energy calculation operations.

The average of the sub-band signal energies is calculated next by calculating means 910. According to the most preferable implementation alternative, the energies of all sub-bands are used for the calculation of the average, but some other selection is also possible, for instance, for making the calculation faster. Next, the energy of each sub-band signal is compared with the calculated energy average by comparing means 912. The comparison of the sub-band signal energies with the average is typically implemented with a processor, by means of software or logic circuits. If any of the sub-band signal energies exceeds the average by a predetermined threshold value, the power of said sub-band signal is clipped by clipping means 914 to a predetermined level which typically is the average or the average added with the desired threshold value. Finally, the separate sub-band signals and the diversity branch signal are combined with a baseband combiner 916 into one signal to be forwarded to base band parts 918. In this manner, the preferred embodiment of the invention equalizes the background noise coming to the receiver by deleting the sudden power peaks caused by the interference signals summed thereto. A previously calculated average or a typical average calculated by statistical methods can be used as reference average, so as to make the method faster, if necessary.

Figure 9B:
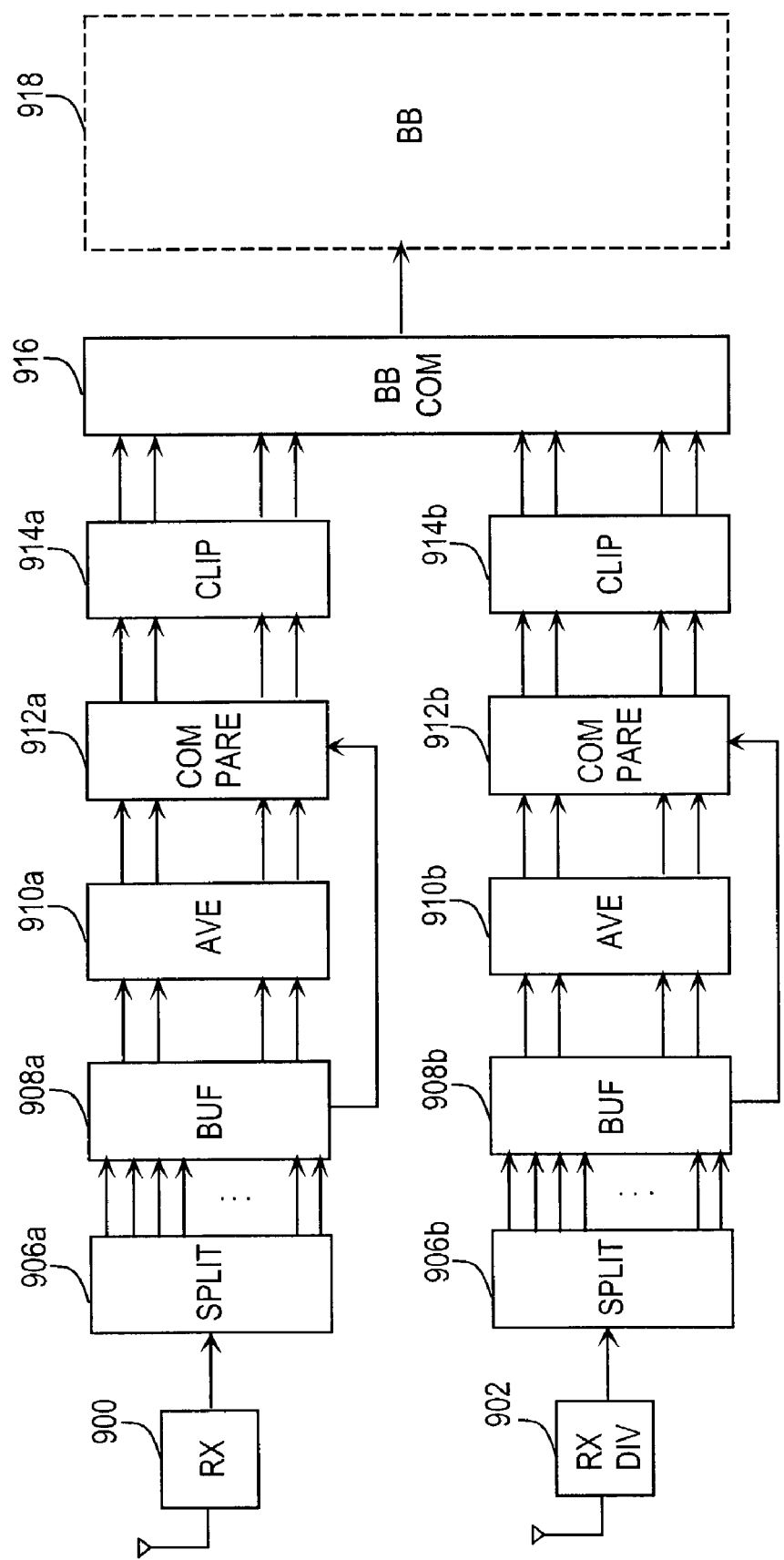
FIG. 9b is a block diagram of a receiver structure implementing another solution according to the invention, when the solution according to the invention is applied separately to either receiver branch.

FIG. 9b describes how the interference algorithm according to the invention can be applied to either receiver branch separately. In that case, both the main branch receiver 900 and the diversity branch receiver 902 each have specific frequency sub-band splitting means and signal energy calculating means 906a–b, buffer memories 908a–b, means for calculating the average of the sub-band signal energies 910a–b, means for comparing the sub-band signal energies with the average 912a–b and the signal level clipping means 914a–b. Also in this embodiment the buffer memory and the splitting and calculating means can change places, as shown in FIG. 6. In this solution it is possible to select whether the method of the invention is applied to either branch or to one branch only. When the method of the invention is applied to either receiver branch, the frequency bands to be clipped can be selected for different branches independently.

Even though FIGS. 6a–b and 9a–b only show a receiver structure comprising the main branch and one diversity branch, it is obvious to a person skilled in the art that the receiver structure can also be of some other kind, for instance, comprising three diversity branches and one main branch, to all of which or some of which the solution of the invention can be applied. In addition, it is also obvious that the interference cancellation algorithm according to the invention can also be applied antenna-beam-specifically, not only receiver-specifically, typically in systems employing directional antennae.

Even though the invention is described above with reference to the example of the drawings, it is clear that the invention is not restricted thereto but it can be modified in a variety of ways within the scope of the inventive idea disclosed in the attached claims.

What is claimed is:

1. A method for cancelling interfering narrowband signals in a receiver of a broadband communications system comprising:
   determining an energy of a received signal in sub-bands, a sub-band width being defined by the interfering narrowband system, wherein sub-band signal energies are only measured according to a frequency hopping pattern of the interfering narrowband system on frequency bands in use at a particular time;
   calculating an average of the energies of the sub-band signals;
   comparing energies of desired sub-band signals with the average of the sub-band signal energies; and
   cancelling interference if any of the sub-band signal energies exceeds the average by a predetermined threshold value.

2. A method for cancelling interfering narrowband signals in a receiver of a broadband communications system comprising:
   splitting a frequency band of the broadband communications system into sub-bands; a sub-band width being defined by the interfering narrowband system;
   determining an energy of a received signal in sub-bands by measuring sub-band signal energies according to a frequency hopping pattern of the interfering narrowband system on frequency bands in use at a particular time;
   calculating an average of the energies of the sub-band signals;
   comparing energies of desired sub-band signals with the average of the sub-band signal energies; and
   cancelling interference if any of the sub-band signal energies exceeds the average by a predetermined threshold value.

3. A method as claimed in claim 1 or 2, wherein the sub-band width equals a bandwidth of the interfering narrowband system and wherein the sub-band signal energies are only measured according to a frequency hopping pattern of the interfering narrowband system on frequency bands in use at a particular time.

4. A method as claimed in claim 1 or 2, wherein interference is cancelled by clipping sub-band signal power to a predetermined level.

5. A method as claimed in claim 1 or 2, wherein interference is cancelled by clipping sub-band signal power to the average power level of the sub-band signal energies.

6. A method as claimed in claim 1 or 2, wherein interference is cancelled by clipping sub-band signal power to a level which is the average power of the sub-band signal energies added with a predetermined threshold value.

7. A method as claimed in claim 1 or 2, wherein interference is cancelled by filtering one or more sub-bands selected based on the determined sub-band signal energy from the received broadband signal by at least one filter.

8. A method as claimed in claim 1 or 2, wherein interference is cancelled from a composite signal of the signals received from a main branch receiver and at least one diversity receiver.

9. A method as claimed in claim 1 or 2, wherein interference is cancelled from a signal received by a main branch receiver and from a signal received by at least one diversity receiver separately.

10. A method as claimed in claim 1 or 2, wherein interference is cancelled from a signal received in a main branch of the receiver.

11. A method as claimed in claim 1 or 2, wherein interference is cancelled from a signal received in at least one diversity receiver.

12. A method as claimed in claim 1 or 2, wherein interference is cancelled antenna-beam-specifically.

13. An arrangement for cancelling interfering narrowband signals in a receiver of a broadband communications system, comprising:
means for determining an energy of a received signal in sub-bands narrower than a frequency band of the broadband communications system;
means for calculating an average of the sub-band signal energies;
means for comparing the energies of desired sub-band signals with the average of the sub-band signal energies; and
means for cancelling interference if any of the sub-band signal energies exceeds the average by a predetermined threshold value.

14. An arrangement for cancelling interfering narrowband signals in a receiver of a broadband communications system, comprising:
means for splitting a frequency band of the broadband communications system into sub-bands, a sub-band width being defined by the interfering narrowband system;
means for determining energy of a received signal in sub-bands by measuring sub-band signal energies according to a frequency hopping pattern of the interfering narrowband system on frequency bands in use at a particular time;
means for calculating an average of the sub-band signal energies;
means for comparing energies of desired sub-band signals with the average of the sub-band signal energies; and
means for cancelling interference if any of the sub-band signal energies exceeds the average by a predetermined threshold value.

15. An arrangement as claimed in claim 13 or 14, wherein the sub-band width equals the bandwidth of the interfering narrowband system and wherein the means for determining the sub-band signal energies determines the sub-band energies only according to a frequency hopping pattern of the interfering narrowband system on frequency bands in use at a particular time.

16. An arrangement as claimed in claim 13 or 14, further comprising means for cancelling interference by clipping power of a sub-band signal to a predetermined level.

17. An arrangement as claimed in claim 13 or 14, further comprising means for cancelling interference by clipping power of a sub-band signal to a level of the average power.

18. An arrangement as claimed in claim 13 or 14, further comprising means for cancelling interference by clipping a power of a sub-band signal to a level which is the average power of the sub-band energies added with a predetermined threshold value.

19. An arrangement as claimed in claim 13 or 14, further comprising means for cancelling interference by filtering one or more sub-bands selected on the basis of sub-band signal energy measurements from the received broadband signal by at least one filter.

20. An arrangement as claimed in claim 13 or 14, further comprising a main branch and at least one diversity branch and is arranged to cancel interference from a composite signal of the signals received from a main branch receiver and at least one diversity receiver.

21. An arrangement as claimed in claim 13 or 14, further comprising a main branch of the receiver and at least one diversity branch of the receiver and wherein the arrangement is arranged to cancel interference from an incoming signal of the main branch of the receiver and from the incoming signal of the at least one diversity branch of the receiver separately.

22. An arrangement as claimed in claim 13 or 14, wherein the arrangement is arranged to cancel interference from a main branch of the receiver.

23. An arrangement as claimed in claim 13 or 14, wherein the arrangement is arranged to cancel interference from at least one diversity branch of the receiver.

24. An arrangement as claimed in claim 13 or 14, wherein the arrangement is arranged to cancel interference antenna-beam-specifically.

25. A receiver, comprising:
means for determining an energy of a received signal in sub-bands, a sub-band width being defined by an interfering narrowband system, the means measuring sub-band signal energies according to a frequency hopping pattern of the interfering narrowband system on frequency bands in use at a particular time;
means for calculating an average of the sub-band signal energies;
means for comparing the energies of desired sub-band signals with the average of the sub-band signal energies; and
means for canceling interference if any of the sub-band signal energies exceeds the average by a predetermined threshold value.

26. A receiver, comprising:
means for splitting a frequency band of a broadband communications system into sub-bands, a sub-band width being defined by an interfering narrowband system;
means for determining an energy of a received signal in sub-bands by measuring sub-band signal energies according to a frequency hopping pattern of the interfering narrowband system on frequency bands in use at a particular time;
means for calculating an average of the sub-band signal energies;
means for comparing energies of a desired sub-band signals with the average of the sub-band signal energies; and
means for canceling interference if any of the sub-band signal energies exceeds the average by a predetermined threshold value.

27. A network element, comprising:
means for determining an energy of a received signal in sub-bands, a sub-band width being defined by the interfering narrowband system, the means of measuring sub-band signal energies according to a frequency hopping pattern of the interfering narrowband system on frequency bands in use at a particular time;

means for calculating an average of the sub-band signal energies;

means for comparing energies of desired sub-band signals with the average of the sub-band signal energies; and means for canceling interference if any of the sub-band signal energies exceeds the average by a predetermined threshold value.

28. A network element, comprising:

means for splitting a frequency band of a broadband communications system into sub-bands, a sub-band width being defined by an interfering narrowband system;

means for determining an energy of a received signal in sub-bands by measuring sub-band signal energies according to a frequency hopping pattern of the interfering narrowband system on frequency bands in use at a particular time;

means for calculating an average of the sub-band signal energies;

means for comparing energies of desired sub-band signals with the average of the sub-band signal energies; and means for canceling interference if any of the sub-band signal energies exceeds the average by a predetermined threshold value.

* * * * *